March 2, 1965  C. J. SCHELL, JR., ETAL  3,171,379
HYDRO-PNEUMATIC RAMJET
Filed July 18, 1960 7 Sheets-Sheet 1
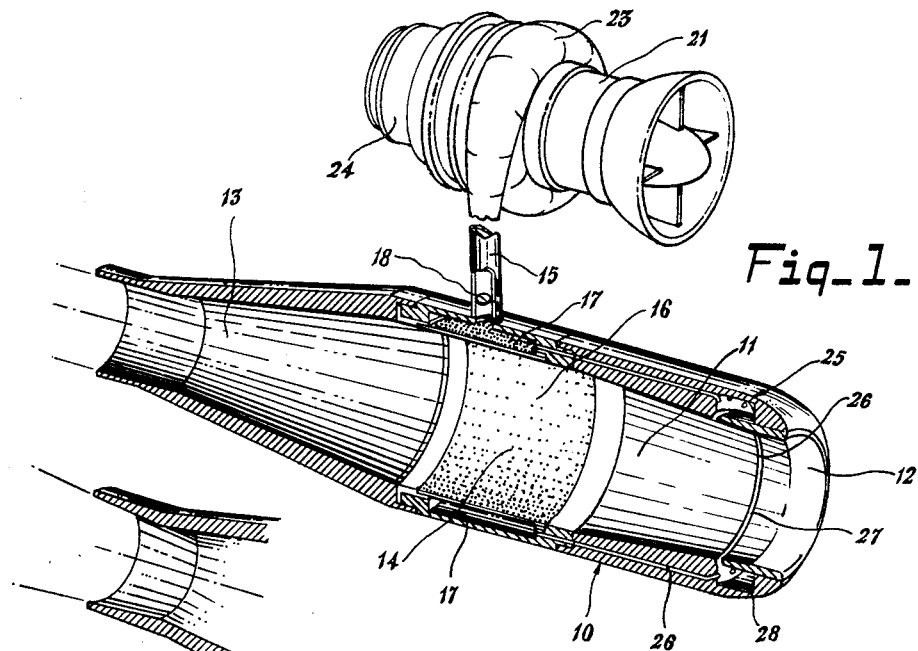
Fig. 1.
Fig. 1a.
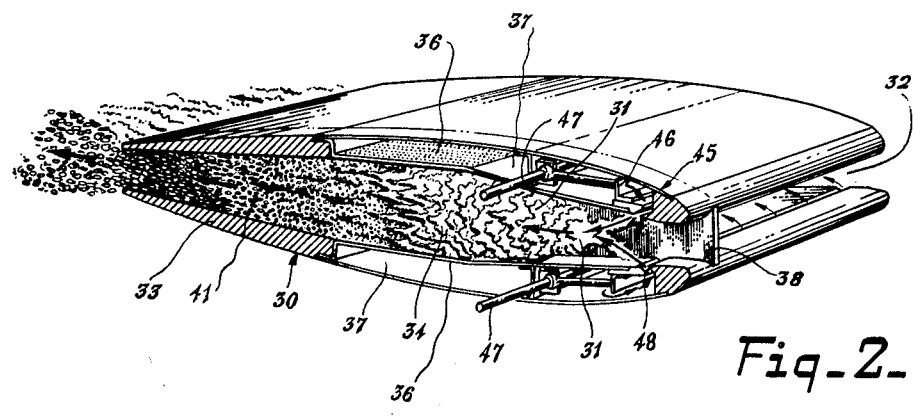
Fig. 2.
INVENTORS
CHARLES J. SCHELL, JR.
HAROLD ORNOFF
BY
Julian C. Rayfes
ATTORNEY March 2, 1965   C. J. SCHELL, JR., ETAL   3,171,379
HYDRO-PNEUMATIC RAMJET
Filed July 18, 1960   7 Sheets-Sheet 2
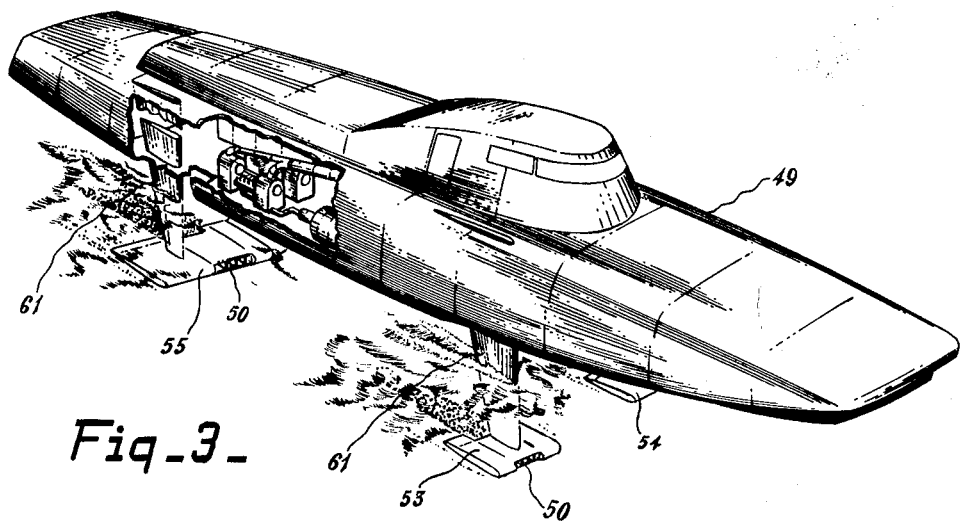
Fig_3_
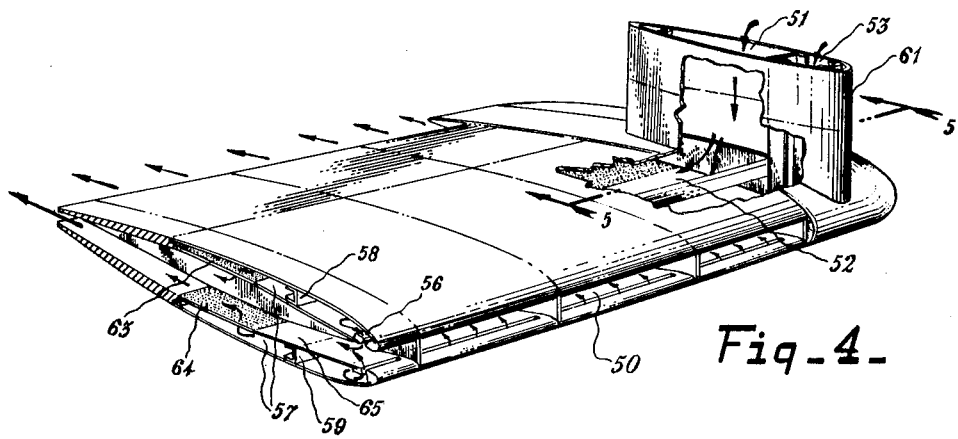
Fig_4_
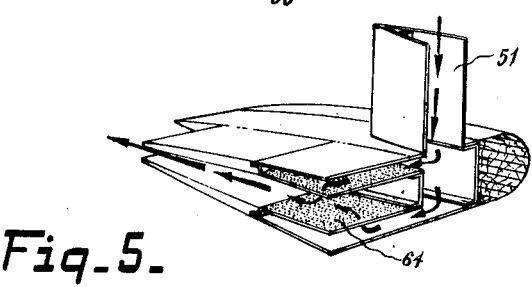
Fig_5_
INVENTORS
CHARLES J. SCHELL, JR
HAROLD ORNOFF
BY
ATTORNEY

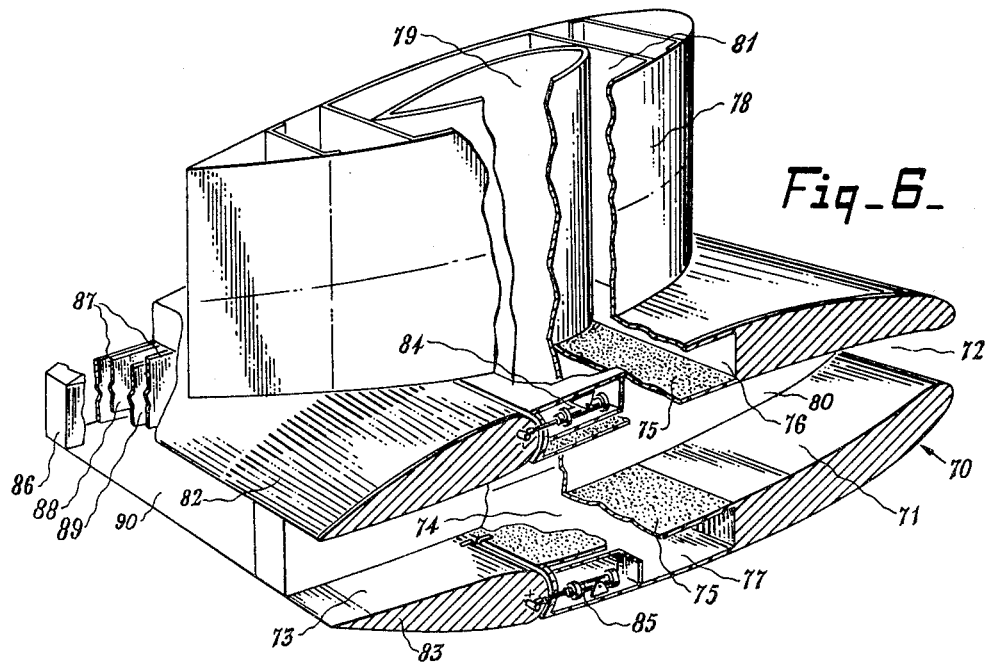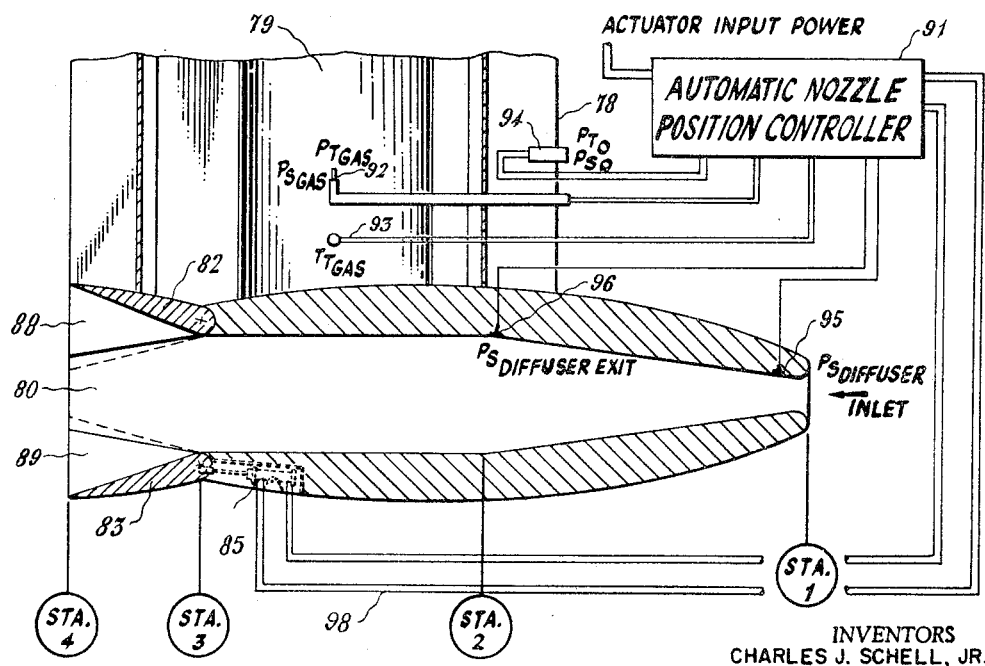

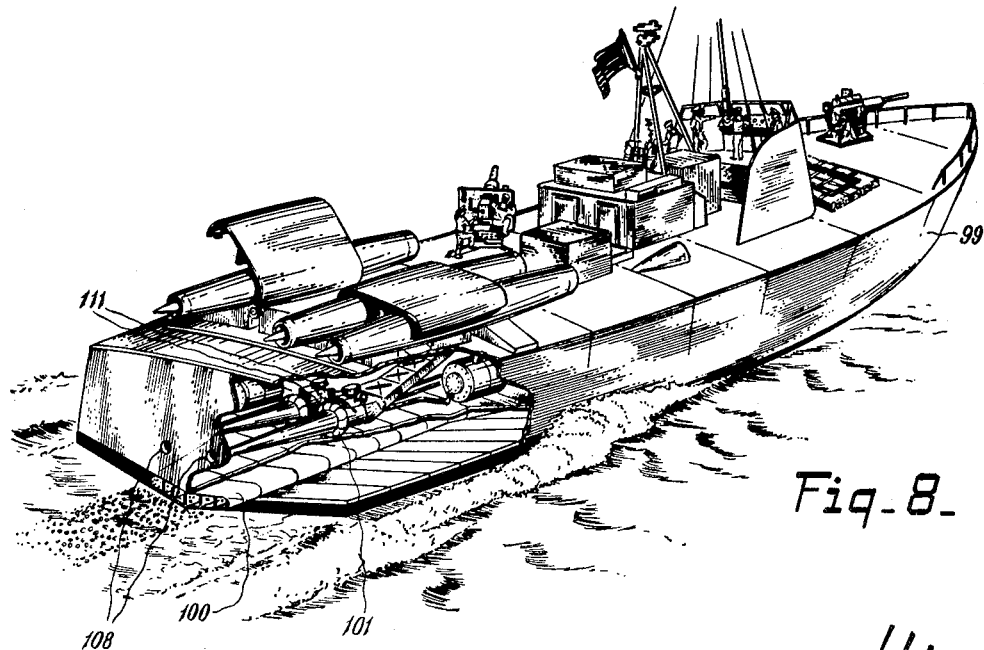
Fig_8_
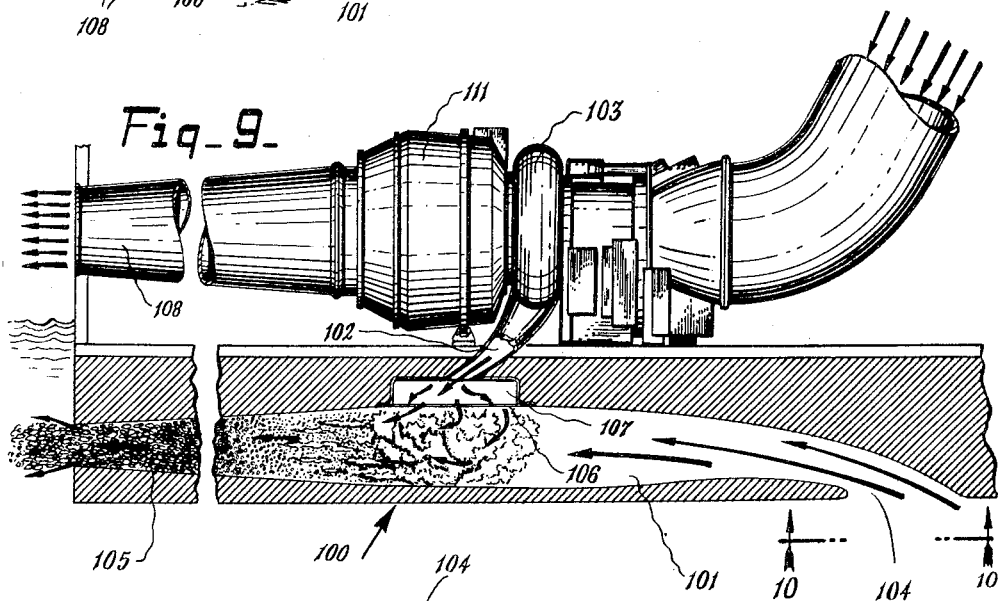
Fig_9_
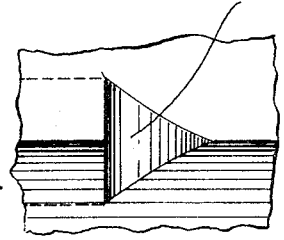
Fig_10_
INVENTORS
CHARLES J. SCHELL, JR.
HAROLD ORNOFF
BY
ATTORNEY March 2, 1965   C. J. SCHELL, JR., ET AL   3,171,379
HYDRO-PNEUMATIC RAMJET
Filed July 18, 1960   7 Sheets-Sheet 5
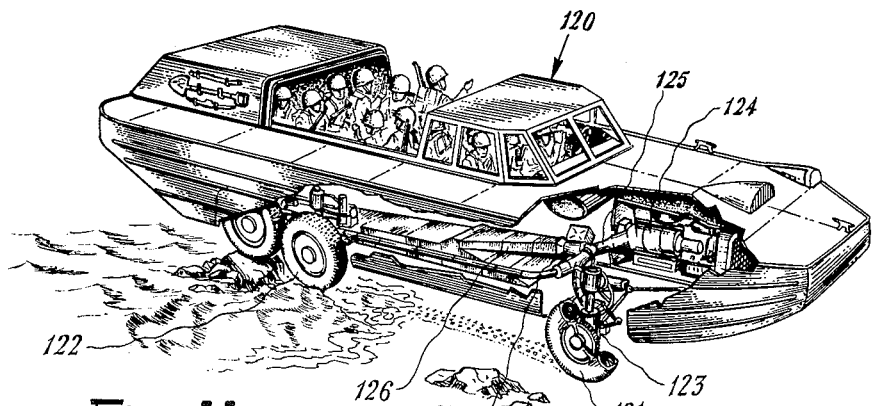
Fig_11_
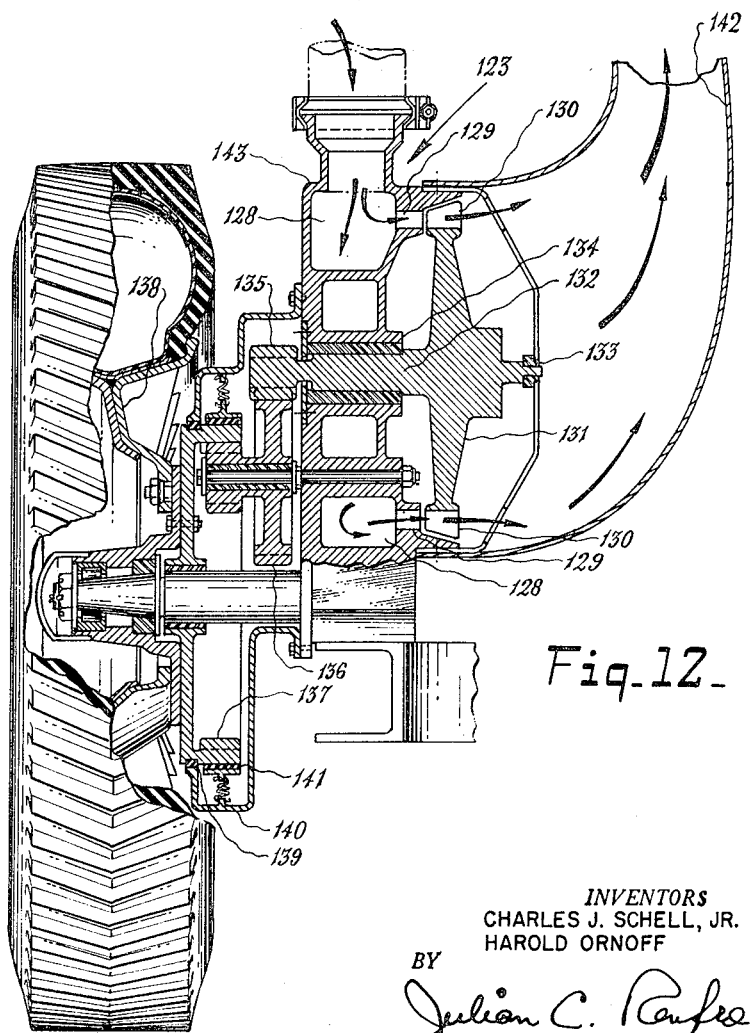
Fig_12_
INVENTORS
CHARLES J. SCHELL, JR.
HAROLD ORNOFF
BY
ATTORNEY

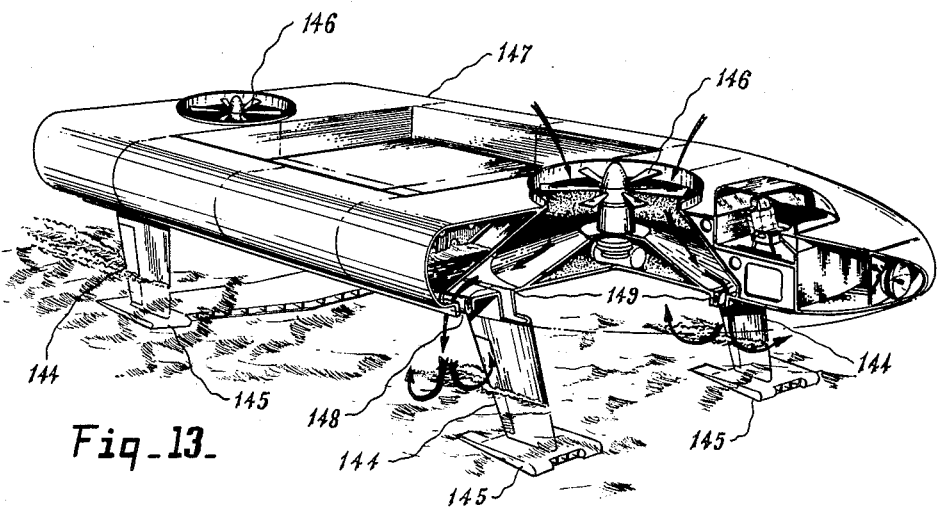
Fig_13_
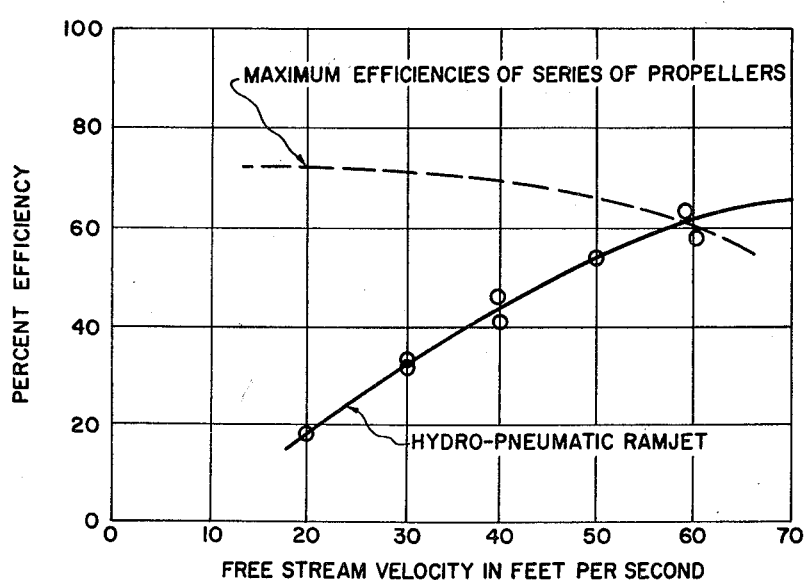
Fig_14_

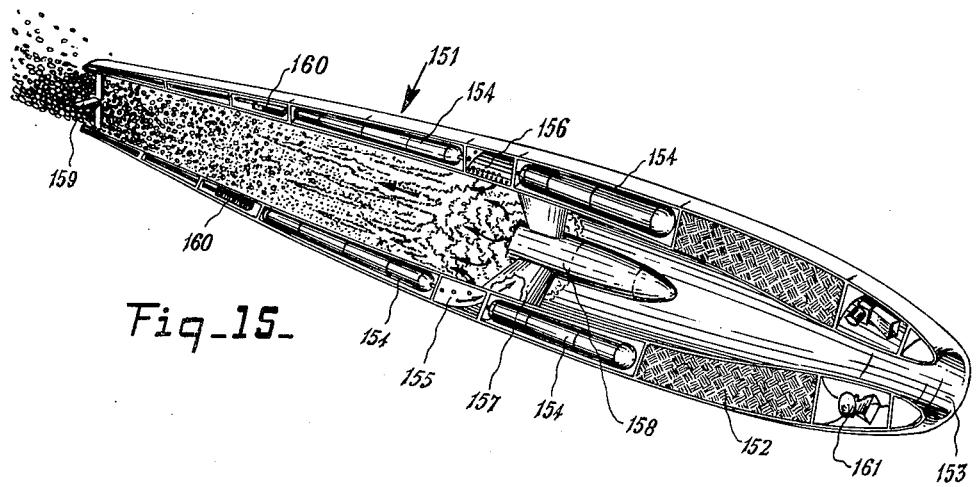
Fig_15_
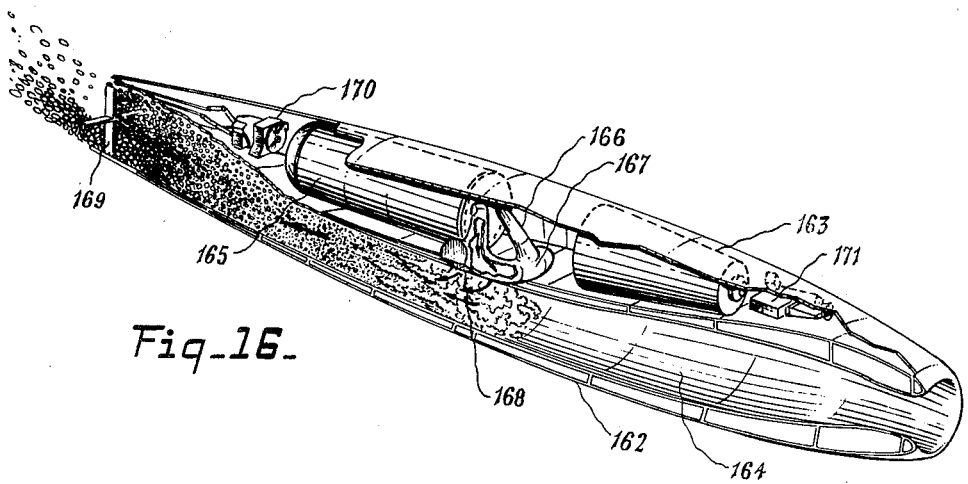
Fig_16_
INVENTORS
CHARLES J. SCHELL, JR.
HAROLD ORNOFF
BY
ATTORNEY

3,171,379
HYDRO-PNEUMATIC RAMJET
Charles J. Schell, Jr., Baltimore, and Harold Ornoff, Lutherville, Md., assignors to Martin-Marietta Corporation, a corporation of Maryland
Filed July 18, 1960, Ser. No. 43,468
20 Claims. (Cl. 114—66.5)

This invention relates to a unique marine propulsion sytem, and more particularly to a hydro-pneumatic ramjet capable of propelling through the water many different types of surface and underwater vessels such as hydrofoil craft, amphibious vehicles, planing hull craft, underwater missiles such as torpedoes, and even aircraft during takeoff, in a highly efficient, easily controlled and inexpensive manner.

For many years the screw propeller has been the accepted means for coupling with water the energy provided by an engine so as to cause a marine vessel to be propelled through the water. However, propellers are not especially efficient, particularly at high speeds because cavitation problems are encountered and wake (slip) losses become severe. Furthermore, the hull of a vessel must be compromised in order to fit a propeller into a desired configuration, and such compromise is not only complicated from the standpoint of marine architecture, but also losses in efficiency result. Also, heavy reduction gears and other machinery are required in order that the propeller be maintained at the proper rotational speed. These factors, plus the necessity for the use of long lengths of heavy shafting for mounting and rotating the propeller cause the weight of a vessel to be increased far in excess of the weight required by the system to be described herein.

The present invention relates to a thrust unit that is extremely effective in converting the potential energy from an energy source, such as fuel, into thrust for propelling a vessel through water. According to the present invention, compressed gas obtained in large quantities from a gas generator such as the exhaust or bleed air of a gas turbine engine is injected into a large mass of water flowing through a passageway through the thrust unit in such a manner as to accelerate the mass of water through a comparatively small increment of speed over that of free stream velocity. The advantage of such an arrangement over an arrangement for greatly increasing the velocity of a comparatively small mass flow of water can be seen from comparing the performance of a paddlewheel boat with a propeller driven boat, with the input power being the same in both boats. The paddlewheel boat, because it acts upon a large mass flow of water, can outpull a propeller driven boat, because of the fact that in the latter case the water has been accelerated to a higher speed and therefore the propulsive efficiency is less. The propeller driven boat suffers this disadvantage because a greater portion of its input power is wasted in the energetic slipstream wake which it forms. In a manner similar to the paddlewheel boat, the present device acts upon a large mass flow of water, and creates a very large thrust.

In order to better comprehend why the present device is able to achieve an efficiency never before possible in underwater propulsion devices, the following discussion is in order:

A reaction device which incorporates a large mass flow rate ($\dot{m}$) and a low exit velocity ($V_e$) is more efficient than one which utilizes a small mass flow rate with a high exit velocity. This fact can best be explained by noting an example of Newton's Second Law, i.e. in a reaction propulsion device, with internal loss-free conditions, in order to maintain a constant speed the force generated by the device ($F_n$) must equal the external losses or drag (D). Thrust is obtained by accelerating the working fluid backward, or in other words, a forward force is obtained by imparting a rearward momentum ($\dot{m}V$) to the fluid. This forward thrust ($F_n$) is equal to the product of the exhaust velocity ($V_e$) and the mass flow of the fluid ($\dot{m}_f$) plus the mass flow of the fuel ($\dot{m}_g$) minus the product of the free stream velocity ($V_0$) and the mass flow of the fluid ($\dot{m}_f$) plus the mass flow of the fuel. However, for purposes of explanation, since the mass flow of the fuel is so small, relatively speaking, it will be disregarded and the statement above can be expressed by the following equation:

$$F_n = \dot{m}V_e - \dot{m}V_0 = \dot{m}(V_e - V_0) \quad (1)$$

Otherwise stated, the net thrust produced, which is the reaction of the acceleration of the water acted upon by the propulsive device, is equal to the momentum increase produced by the thrust unit. The foregoing equation is rigorously correct if the static pressure of the exhaust stream is equal to the static pressure of the medium in which the unit is operating.

This thrust value ($F_n$) can be controlled by the rate of investment of energy into the system and the design of the vehicle employed. The condition to strive for is the generation of a maximum of thrust from a minimum of fuel and the designer of the configuration of the vehicle must keep these goals in mind. The total amount of power ($P_t$) generated in unit time is the propulsive power which is the product of the net thrust ($F_n$) and the incoming, or free stream velocity ($V_0$), plus the power represented by the residual kinetic energy in the slipstream, which is the product of half the square of the relative velocity ($V_e - V_0$) and the mass flow rate of incoming fluid ($\dot{m}_f$). The relative velocity ($V_r$) is defined as the difference between exit velocity ($V_e$) and incoming velocity ($V_0$).

$$\therefore P_t = F_n V_0 + \tfrac{1}{2}\dot{m}V_r^2 \quad (2)$$

The residual kinetic energy ($\tfrac{1}{2}\dot{m} V_r^2$) is wasted energy and is therefore a measure of the inefficiency of a propulsion system in providing thrust. It may be readily seen at this point form a preceding equation that the relative velocity ($V_r$) is equal to the net thrust ($F_n$) divided by the mass flow rate:

or $$V_r = (V_e - V_0) = \frac{F_n}{\dot{m}} \quad (3)$$

Therefore, by subsituting this relative velocity value into the equation for the total power generated, it may be easily seen that it is more efficient to obtain the required thrust by accelerating a large mass flow than a small mass flow, since the loss due to the kinetic energy is inversely proportional to the mass flow rate of fluid.
That is:

$$Pt = F_n V_0 + \frac{\tfrac{1}{2}F_n^2}{\dot{m}} = F_n V_0 + \frac{F_n^2}{2\dot{m}} \quad (4)$$

This may be seen in another fashion by examining the equation for propulsive efficiency. Propulsion efficiency may be expressed as the ratio of propulsive power output or thrust times free stream velocity, to input power, which in a loss-free system, appears as the change in kinetic energy of the working fluid acted upon by the thrust generator or:

$$\eta_p = \frac{F_n V_0}{\frac{\dot{m}}{2}(V_e^2 - V_0^2)} = \frac{2}{1 + \frac{V_e}{V_0}} \quad (5)$$

It may readily be seen from the latter equation that the closer the exit velocity ($V_e$) is to the free stream velocity ($V_0$) the higher the propulsion efficiency.

Therefore, it may be concluded that from the foregoing discussion in order to obtain the highest practical efficiency, a propulsion system which developes thrust by imparting a small velocity to a large mass, thereby maintaining a minimum of difference between free stream velocity ($V_0$) and exit velocity ($V_e$), is the most preferable method for producing thrust.

According to this invention, a very large number of small gas filled bubbles are produced in flowing water while the water is held at an elevated static pressure. The water is thus converted into a quasi-compressible fluid medium and this mixture of gas bubbles and water will accelerate when it is caused to expand through a properly designed nozzle. In other words, the present invention provides an effective coupling between the energy of the compressed gas and the liquid medium in which the vessel is traveling, in that the exhaust velocity of the compressed gas-water mixture at the exit plane of the thrust unit is slightly greater than the initial velocity of the water alone. This enables the present invention to operate at a very high propulsive efficiency (propulsive efficiency in loss-free conditions may be defined as the ratio of the thrust horsepower generated divided by the input horsepower) which is to be contrasted with the low efficiency that has been obtained by prior art hydraulic jet type devices.

As is known, if a jet of compressed gas is injected from an ordinary pipe or duct into a liquid medium, it tends to penetrate the medium in such a manner as to derive only a comparatively small amount of thrust. The gas tends to move through the medium instead of carrying the medium along with it. In other words, the manner in which a compressed gas is injected into the liquid medium that passes through the hydro-pneumatic ramjet has a great deal to do with the efficiency of the device. Accordingly, if large bubbles are initially produced, the transfer of energy is quite inefficient from the thrust standpoint, for "bubble slip" tends to occur, and in such instance, the energy of the compressed gas is not given up completely within the confines of the thrust-producing device.

In contrast, if small bubbles are formed, it is much more difficult for bubble slip to occur for small bubble diameters represent a large drag-to-mass ratio which tends to decrease bubble slip and each small bubble acts against and pushes an incremental portion of the liquid medium.

It is therefore to be seen that the hydro-pneumatic ramjet produces its momentum increase from the conversion of potential energy from one medium (gas) to the kinetic energy of a different medium (water) through an expansion process. The advantage of this principle is the directness of the application of the work of expansion to the environmental medium. A further advantage accrues when the temperature of the gas is less than that of the fluid medium. The water then provides an additional source of energy when used with a gas having an injection temperature equal to or less than itself (e.g., cold gas source). This is true since the gas tends to expand isothermally and, under these circumstances, extracts heat from the water, thereby expanding the gas further. The capability of harnessing the environmental energy for propulsion purposes is unique in the hydro-pneumatic ramjet of this invention.

A further advantage provided by the hydro-pneumatic ramjet, i.e. realization of a great reduction in weight and volume of propulsion machinery, stems from the fact that it permits efficient utilization of an aircraft type turbojet engine for marine propulsion.

The turbojet engine represents a light, compact, high-power-output gas generator suitable for use in conjunction with this invention. Its exhaust gas, which is produced at temperatures of approximately 1000° F., can be reduced to approximately 200° F. through the use of a rotary regenerator which extracts heat from the exhaust gas and returns it to the turbojet cycle immediately upstream of the combustors. Such a system, coupled with the hydro-ramjet, is capable of an installed specific weight of less than one pound per thrust horsepower.

A preferred hydro-pneumatic ramjet, according to this invention, compromises a basic thrust unit having therethrough an unobstructed passageway through which a liquid medium may travel. This thrust unit may be adapted to be used singularly or in a combination with other units disposed about the underside of vessels, integral with the hull, or mounted on pylons. One particularly important utilization of this invention entails the incorporation of the basic thrust units into the hydrofoils of a hydrofoil boat. In each instance, an inlet-diffuser and an exit nozzle are provided for conducting water through said passageway and gas injection means are provided in a location in between the inlet and exit nozzle for injecting pressurized gas in quantity in a substantially peripheral manner into the water flowing through said passageway. This being accomplished in such a manner as to produce a large number of small bubbles of gas in the water.

The function of the inlet-diffuser is to convert the majority of the dynamic pressure of the water entering said inlet into an elevated static pressure by reducing the velocity of the water in a loss-free fashion. The compressed gas need be at a pressure only slightly higher than the pressure of the medium in order to permeate the water in said passageway with a large number of bubbles. This has the effect of converting the incompressible fluid water that flows through the passageway into a compressible medium that can be effectively expanded through the exhaust nozzle of the device, thereby creating substantial thrust and effectively propelling a vessel through the water. The injected gas does not disturb the flow pattern of the water through the passageway, therefore allowing turbulence and drag to be carefully avoided.

The injection means for the compressed gas can advantageously take the form of a porous jacket that substantially surrounds the column of water that flows through the passageway in the thrust unit. This porous means may, for example, be constructed of sintered metal, and may be combined with a plenum that will enable compressed gas to be injected into the water at a uniform rate, and thereby mix thoroughly with water that is to be subsequently expanded through the exhaust nozzle of the thrust unit.

By virtue of this arrangement, the high efficiency and superior specific power (H.P./lb.) of the gas turbine engine and the thrust unit according to this invention, can be effectively combined with the result that the heavy machinery and shafting necessary for a propeller arrangement is eliminated, hull design need not be compromised, and speeds far in excess of those obtainable by the use of a screw propeller can be realized.

Prior art underwater reaction propelled devices in which the inflowing water is decelerated in order to obtain an overall increase in pressure before the production of bubbles in the medium, failed to provide an effective coupling of the energy of the fuel and the medium in which the vessel using such a device operates. Perhaps the most important reason for the failure is the fact that combustion is carried on within the water as it passes through the basic thrust unit of such a device for the purpose of obtaining gases which produce bubbles. The rapid burning and the hot gases thereby created are hard to manage and it is quite difficult to control bubble size and at the same time for the hot gases to become uniformly distributed throughout the medium. The disadvantages of such an arrangement are not overcome by burning the fuel in another portion of the basic propulsion device, because the problem of dealing with rapidly expanding combustion gases still remains and it is quite difficult, if not impossible, to sustain proper combustion and at the same time insure that the combustion gases enter the fluid medium as tiny bubbles. In contrast to such attempts, the arrangement, according to this invention, involves generating the compressed gases at a comparatively remote location to the thrust unit, which means that the products of combustion are much more easily managed. In addition, this arrangement permits the use of devices (such as regenerators) to further reduce the gas temperature without loss in propulsive efficiency if desired in surface applications. Therefore, the compressed gases reach the thrust unit at a lower temperature which, according to the present invention, is more effective and is a departure from the theory of the known prior art devices, wherein it was thought that the higher temperature of the combustion gases would be more effective in developing thrust in the water. However, for underwater applications where it is quite convenient for the gas generator to provide high temperature gases (such as from a solid propellant) the worst performance would occur when the heat transfer occurred at such a fast rate that the potential energy available is that of an equivalent gas at the medium's temperature.

Although a thrust unit may be utilized for the propulsion of a device having a single design point, such as a single speed torpedo, and hence ony require a fixed exit nozzle area, it is expected that most utilizations of this invention will involve the use of variable exit area embodiments in which portions of the nozzle are physically moved in order to accomplish the complete harnessing of the work of expansion represented by the compressed gas. By virtue of the variable area exit nozzle, the expansion process can be controlled so that it can be complete at the exit plane of the nozzle, hence eliminating the penalties associated with the exhaust of gas-water mixture through an under-expanded or over-expanded nozzle arrangement.

To this end, a controller arrangement is provided in which a number of probes are utilized that measure the total heat of water involved, the total head of the compressed gas and other factors that must be taken into consideration in the positioning of the portions of the exit nozzle to achieve proper expansion.

Other embodiments utilizing planing hull type craft, ground effect craft, as well as amphibious type vehicles, are within the scope of this invention, with it being understood that in all cases, high temperatures may be limited to the gas generator, which of course simplifies the construction of the thrust unit and makes unnecessary elaborate metallurgical techniques and minimizes the need for safety precautions.

These and other objects, features, and advantages of this invention will be apparent from a study of the drawings in which:

FIGURE 1 is a perspective view of an exemplary thrust unit according to this invention, with certain portions removed for clarity, the unit being illustrated in conjunction with a typical gas generator for supplying energy;

FIGURE 1a reveals a convergent-divergent exit nozzle of the type with which the thrust unit of FIGURE 1 may be used;

FIGURE 2 is a perspective view of a lifting surface or hydrofoil type of thrust unit, revealing details of a starting injector system utilized when this typical thrust unit is to be started from the static condition;

FIGURE 3 illustrates the adaption of a ramjet, according to this invention, for the propulsion of a hydrofoil boat or ship;

FIGURE 4 represents a perspective view, to an enlarged scale, of a typical hydrofoil of the boat of FIGURE 3 in which a thrust unit, according to this invention, is utilized, with certain portions being cut away to reveal internal construction;

FIGURE 5 is a cross-sectional view taken along lines 5—5 of FIGURE 4;

FIGURE 6 is a perspective view, partly in section, of an embodiment in which a variable exit nozzle may be utilized;

FIGURE 7 is a side elevation view of an embodiment similar to FIGURE 6, utilized in conjunction with an exit nozzle controller;

FIGURE 8 illustrates a high speed boat, in the nature of a PT boat, in which a thrust unit, according to this invention, is incorporated into the hull;

FIGURE 9 is a cross-sectional view through the hull of the boat of FIGURE 8, revealing the thrust unit thereof;

FIGURE 10 is a view taken along lines 10—10 in FIGURE 9 to reveal inlet details as seen from the underside of the vessel;

FIGURE 11 illustrates an amphibious vehicle utilizing a propulsion arrangement in which compressed gas is delivered to a thrust unit, according to this invention, to develop propulsion through the water, and diverted to wheel turbines for overload propulsion of the vehicle;

FIGURE 12 is a cross-sectional view of a typical wheel unit for the vehicle of FIGURE 11 in which the means for delivering power to each wheel is revealed in detail;

FIGURE 13 is a water based vehicle employing means for generating quantities of compressed gas for utilizing the surface effect principle, and also employing hydropneumatic ramjet units, according to this invention, to provide forward thrust;

FIGURE 14 is a graph showing variation of measured thrust efficiency versus velocity;

FIGURE 15 is a torpedo utilizing a thrust unit, according to this invention, disposed symmetrically upon a center line of the vessel; and FIGURE 16 is another torpedo configuration in which the thrust unit is located off the center line in order that a particular type of warhead may be employed.

Referring to FIGURE 1, basic thrust unit 10 is illustrated to contain a passageway 11, so that as thrust unit 10 travels through the liquid medium, such as water, the medium will flow continuously through passageway 11. As will be seen hereinafter, a marine vessel employing this invention may utilize one or more thrust units, which may be integral with the hull of the vessel, or alternately supported from appropriate structure in an optimum position alongside or under the hull.

Inlet-diffuser 12 and an exit nozzle 13 are at the fore and aft ends of passageway 11, respectively, with inlet-diffuser 12 being arranged to cause a large portion of the dynamic pressure of the inflowing fluid medium to be converted into static pressure upon reaching a maximum point of diffusion 14 of passageway 11. Similarly, exhaust nozzle 13 is arranged to allow the fluid leaving the passageway to expand so as to extract an optimum amount of energy from compressed gas supplied in quantity to the thrust unit. Depending upon the desired exhaust velocity, the nozzle may be convergent, as seen in FIGURE 1, or convergent-divergent, as seen in FIGURE 1a.

During its intended operation, thrust unit 10 is submerged in the fluid medium and quantities of compressed gas are piped thereto by means of duct or pipe 15 so that the compressed gas will be caused to mingle with the medium flowing through passageway 11. It has been found that the energy contained in the compressed gas, which is the energy that is to be delivered to the fluid medium flowing through passageway 11, can be most effectively coupled therewith by causing the compressed gas to be widely distributed through the medium in the form of tiny bubbles so as to achieve an intimate mixture with the medium. To this end, a porous jacket 16 is provided around the circumference of the central portion of passageway 11, through which the compressed gases are caused to flow, and thereby be broken up into many small bubbles. A circumferential plenum 17 may be utilized with the porous jacket so that a constant supply of compressed gas may be provided, substantially surrounding the medium flowing through passageway 11. Porous jacket 16 may be made of sintered metal, for example, but this is merely exemplary and not controlling.

The high energy contained in the compressed gases flowing from the gas generator into the thrust unit 10 are advantageously coupled with the fluid medium in such a manner that a very high overall efficiency may be obtained. This is because, unlike prior art arrangements in which a single jet of water or gas was employed, the very large number of bubbles issuing from the porous jacket 16 of the present invention are caused to mix intimately with the water in passageway 11, in such a manner that each bubble acts directly against an incremental portion of water, causing it to be accelerated rearwardly. This is, of course, to be contrasted with the effect obtained by using a single gas jet that is injected in water, which tends to penetrate the fluid medium and thereby dissipate its energy quite ineffectively. Therefore, the present invention for the first time enables the great quantity of compressed gas generated to be harnessed directly to the fluid medium without the necessity of the utilization of heavy complicated arrangements commonly associated with the use of screw propellers for propelling ships.

As illustrated in FIG. 1, the basic thrust unit 10, according to this invention, is adapted to produce thrust directly from a basic gas generator 21 with no need for intermediate gearing or shafting. Accordingly, a gas generator 21 in the nature of a turbojet engine, for example, may be employed, with pipe 15 connected thereto so as to deliver gas under pressure to plenum 17 so that a considerable amount of thrust can be delivered. A shut-off valve 18 may be employed to prevent reverse flow of water into the gas generator during deceleration or may be used together with the engine control system as a means of controlling the power input to the hydro-pneumatic ramjet in order to achieve optimum engine operating conditions. As illustrated, gas generator 21 may be provided with a scroll case 23 designed to receive large quantities of compressed gas from the gas generator 21, with the typical temperature for this compressed gas or air being in the vicinity of 400° to 600° F. It is not necessarily desirable that high temperature gas be supplied to the thrust unit, such as the hot gases emanating from the tailpipe 24 of gas generator 21, although it should be noted that combustion products, as well as uncombusted air, may be employed in appropriate instances in the practice of this invention. Accordingly, it is to be seen that by disposing the thrust unit 10 in the water below or alongside a craft to be propelled, and supplying it with large quantities of compressed gas from an appropriate gas generator 21 carried aboard the craft, the craft can be propelled through the water very effectively.

In order to facilitate acceleration of the device of FIGURE 1 from rest, an appropriate static thrust device 25 may be employed. In the illustrated embodiment this comprised a circumferential slot 27, a plenum 28 to which is supplied high pressure air from plenum 17 via connecting pipe 26, with the flow through pipe 26 being controlled by appropriate valves (not shown). Therefore, upon these valves being opened, pressurized gas is caused to flow through circumferential slot 27, which is disposed at such an angle to the centerline through thrust unit 10 as to form a conical sheet tending to pump water through the inlet 12 and out the outlet 13 of the thrust unit 10, and thereby bring about sufficient starting thrust. The conical sheets also provides a "pneumatic curtain" effect as hereinafter described. At a certain speed, the valve means are closed thereby allowing all of the compressed gas produced by gas generator 21 to flow through porous jacket 16. It is to be understood that other types of starting devices could be employed if desired. For example, a conventional propeller could be adapted for this purpose, or a separate auxiliary propulsion system of conventional design could be employed for initially propelling the boat or other vessel through the water.

Referring to FIGURE 2, the illustrated embodiment is of a so-called "two-dimensional" configuration adapted, for example, to be employed in conjunction with a hydrofoil boat, such as of the type shown in FIGURE 3. The basic thrust unit 30 has a passageway 31 therethrough which has inlet and outlet portions 32 and 33. Mid portion 34 intermediate to the inlet and outlet extends longitudinally along the thrust unit, with a porous jacket 36 defining top and bottom portions of the passageway, being located both above and below the liquid medium flowing through passageway 31. Through these porous jackets, the high pressure gas from upper and lower plenums 37 is injected into the liquid medium so as to cause thrust to be developed, although if preferred, gas may be injected from only one side of the medium. Fine mesh screening may be employed for jackets 36, such screening being manufactured by Air Porous Media, for example. As apparent from FIGURE 2, the inlet lip is smoothly curved and may be of a configuration corresponding to NACA (now NASA) Series Type 1. Vertical partitions 38 may, if desired, be provided in the event this type of thrust unit is of considerable width, not only for the purpose of strength, but also to isolate certain sections of the thrust unit 30 so that static thrust devices may be employed therein and to eliminate spanwise flow.

The static thrust device 45 that may be used with the embodiment of FIGURE 2 employs upper and lower slots 48 through which compressed gas flows, with these slots being angled or sloped as shown in FIGURE 2, to cause the sheets of gas emanating therefrom to converge in the manner illustrated by the use of arrows, and thus provide a considerable pumping action for the starting thrust of a craft so equipped. Appropriate valving means 46 are employed to control the issuance of compressed gas from the starting slots so that after the craft has achieved sufficient speed, these valves can be closed by the operation of levers 47 to cause the compressed gas to flow only through the porous jackets.

It should be noted that a large number of bubbles are generated immediately downstream of the porous walls as a result of high pressure air or gas flowing through the very large number of tiny passages contained therein. This is, of course, desirable, for if a less number of proportionately larger bubbles are created, they tend to penetrate the medium and supply little thrust, whereas a large number of small bubbles result in many incremental portions of the liquid medium being caused to be pushed rearwardly.

For many embodiments of this invention, an outlet nozzle of the type illustrated in FIGURE 2 is preferable, namely a converging nozzle. This means that the water-gas mixture flowing rearwardly through passageway 41 is caused to decrease in pressure and increase in momentum thus producing a considerable amount of thrust. It should be noted, however, that this invention is not in any way limited to the use of a converging exit nozzle, for in high speed applications a convergent-divergent nozzle would be preferred. FIGURE 1a illustrates a nozzle of this type designed for use in conjunction with the embodiment of FIGURE 1.

It is to be noted that the ramjet geometry may be such as to produce a completely three dimensional internal flow field, as is illustrated in FIGURE 1; a two-dimensional internal flow field as illustrated in FIGURE 2; or any intermediate flow field form. The important geometric characteristic is the cross-sectional area variation along the length of the duct; therefore, the cross-sectional shape may be round, rectangular, oval, etc., as required by the individual vehicular application.

In FIGURE 3, high speed craft 49 is illustrated, which is equipped with a more or less conventional hull, but also supplied with hydrofoils for high speed travel over the water. Hydrofoil boats obtain their support when traveling through the water by means of lifting forces exerted by the immersed surface located at fore and aft positions on the hull of the boat. These surfaces develop lift in a similar manner to the lift developed on the wings of an airplane by virtue of the stream flowing thereover, causing the hull of a hydrofoil boat to gradually lift as the speed of the craft increases, until finally the hull is entirely clear of the water. This elevating of the hull not only causes drag forces to be reduced by approximately 50%, but also almost entirely eliminates the action of waves on the hull.

A number of different type hydrofoils may be employed according to this invention, the various types being as follows:

(a) *Multiple-foil "ladder" systems.*—Configurations of this type employ units of two or more foils arranged one above the other, in an arrangement similar to a ladder. Control of the craft's height relative to the water surface is afforded by the submergence and emergence of one or more of the foils as required.

(b) *Surface piercing foil systems.*—This configuration employs V-shaped foils which pierce the water surface. Control is afforded by the increase or decrease of foil area as required.

(c) *Submerged foil with planing surface control.*—This configuration employs a large load carrying foil completely submerged, with planing surfaces at the fore end of the craft. Control is afforded by the planing surfaces maintaining their position at the water surface while the craft turns to different angles thus enabling changes in foil angle and consequent changes in foil lift as required.

(d) *Fully submerged foil system.*—In this configuration, the foils are fully submerged and control is afforded by remote means that change the angles of attack of various foil components in relation to the craft, thus changing the lift as required.

The hydrofoil boat has a number of advantages over speed boats of equal displacement. The engine power required to reach a certain speed is only about ½ of that required for conventional boats, thus permitting the use of less costly lower horsepower engines. A substantial reduction in fuel consumption is also an immediate advance of the lower power requirement. The fuel economy and high speed characteristics of a hydrofoil boat result in a 30% reduction of operating cost, and since this type of craft actually develops about two times the speed of conventional boats, its transport capacity is much greater than that of conventional boats. A hydrofoil boat has the further advantage that in rough water its rolling and pitching movement is much less, and even at maximum speed, the waves created by this type of craft are small, permitting even narrow rivers to be navigated at high speeds without endangering shore craft or shore installations.

However, hydrofoil boats have not been used in many operations due to the complexities associated with providing means for turning the propellers used for propelling the craft through the water. The necessity of employing a drive shaft long enough to transmit power from an engine arrangement centrally located in the hull to a propeller arrangement located far below the hull in relation to the rear hydrofoil configuration has up to now been a serious drawback. The shaft connecting the engine and propeller must be of considerable length and necessitate a substantial construction arrangement to prevent whip of the shaft at high rotational speeds.

The present invention may be employed in a hydrofoil type boat in a highly advantageous manner, inasmuch as the propeller is eliminated and power is transmitted by pneumatic rather than mechanical means. According to a preferred embodiment shown in FIGURE 3, thrust units 50 are contained in right hydrofoil 53, left hydrofoil 54 and rear hydrofoil 55 of craft 49. In each instance the thrust units may extend the entire dimension of the hydrofoil, or be subdivided by partitions as shown in FIG. 4. In latter figure, the foil is of substantial length inasmuch as it represents the left half of hydrofoil thrust unit 55, and preferably a number of thrust units 50 may be employed. By providing thrust units in both fore and aft locations, even more power can be obtained than is possible with arrangements in which only the rear foil of a boat or ship is associated with the power producing arrangement.

The vessel 49 is preferably equipped with hydrofoils located on pylons 61 that are constructed to retract and allow the hydrofoil thrust units 50 to be brought up close to, or even into the hull of the vessel, so that the boat at low speeds can traverse very shallow water. The extension of these lifting thrust units could be controlled by hydraulic jack-type devices, by electric screw jacks, or the like. Alternatively, the pylons 61 could be hinged at their intersection with the hull so that they could be redirected fore or aft to minimize the depth of water required for the operation of the craft. These hydrofoil-hydropneumatic ramjet units not only provide lift, but also supply both static thrust for the starting of the craft as well as thrust for high speed travel.

The type of foil preferably employed on the boat of FIGURE 3 is depicted in detail in FIGURES 4 and 5, but it should be realized that other types of foils may be employed if desired. For example, for very high speeds, it is preferable for the hydro-pneumatic ramjet to be of a different type, such as for example, the foil would be configured to be of a super-cavitating type.

As seen in FIGURE 4, the pylon and thrust unit when cut away reveals passageway 51 extending through the pylon 61 and into the longitudinal passageways 52 and provided longitudinally along the airfoil shape device. Therefore, the high pressure gas flowing through passageways 51 and 52 is brought into contact with the porous walls, from which it can escape into the passageways extending fore and aft through the thrust units. Starting air for the static thrust device 56 is supplied through forward passageway 53 of the pylon which is isolated by structural members 58 and 59 from the plenum 57 associated with the porous walls 63 and 64. Accordingly, the operation of the static thrust device can be controlled from the inside of the craft merely by the operation of appropriate valving that controls the flow through the passages.

It should be appreciated that the hydrofoil concept and the underwater ramjet concept can be combined very effectively, because the provision of power at the hydrofoil allows the expensive and weighty shafting arrangements to be eliminated. The basic thrust unit 50, according to this arrangement, is designed for operation in conjunction with a gas turbine engine, which is an extremely economical power plant for this type of craft.

As seen in FIGURE 3, a plurality of engines such as gas turbines or free piston engines may be employed, with the compressed gases generated thereby being ducted to the several thrust units. Although combustion gases from the gas turbine or the free piston engine may be employed, it should be realized that it is not necessary for the effective use of a hydro-ramjet device of the nature of this invention to utilize compressed gas of elevated temperature. Rather, the lower the temperature, the greater the isothermal efficiency of the thrust unit, because heat energy can be extracted from the liquid medium in which the vessel is operating. This, of course, is substantial departure from the devices of the prior art which strived to provide a jet type device for producing thrust, utilizing combustion carried on in a thrust unit disposed below the surface of the water. Such devices proved to be extremely inefficient and impractical because they merely heated the liquid medium in which they were immersed and provided little thrust.

In contrast, the present device represents a transition of energy from the gaseous medium to the liquid medium which is accomplished by dispersing the gases into a large number of bubbles with each of the bubbles acting on an incremental portion of the water thereby providing thrust for propelling the craft. Because of the ease with which the several thrust units of a hydrofoil boat could be supplied with compressed gas, thrust could be obtained at each hydrofoil unit. This would be an extremely difficult arrangement for a propeller driven craft in view of the large amount of gearing and shafting that would be required.

In FIGURE 6 is illustrated a lifting thrust generator embodiment of this invention in which the exit nozzle is constituted by pivoted upper and lower nozzle segments which selectively bring about a variation in exit nozzle area, this being done so that variations in input gas horsepower, water flow rate, free stream velocity and changes in ambient static pressure will not cause the thrust unit to operate in a condition in which the exit arrangement does not extract the maximum attainable amount of thrust from the gas-water mixture flowing from the unit.

The basic hydrofoil unit 70 is internally configured to include a passageway 71 extending therethrough, with an inlet 72 and an outlet nozzle 73 being at the forward and rear ends of the passageway. In a midportion 74 of the unit are a pair of porous walls 75 which separate upper plenum 76 and lower plenum 77 from the passageway 71. The basic hydrofoil unit is supported below the vessel it is propelling from a pylon 78 which contains a pair of generally concentric ducts, with an inner duct 79 being arranged to carry pressurized gas down through partition 80 to lower plenum 77 and surrounding duct 81 being arranged to convey pressurized gas directly to upper plenum 76. As previously indicated, the large quantities of compressed gas travelling through the ducting to the plenum then flows through porous walls 75 into the fluid medium flowing through passageway 71 to form a large number of tiny bubbles and thus cause substantial amounts of thrust to be evolved for the high speed propulsion of the vessel.

Perhaps the most significant portion of the embodiment, according to FIGURE 6, is the variable area outlet arrangement, by virtue of which the optimum exit area may be maintained through a broad range of operational conditions. Upper and lower nozzle segments 82 and 83 are responsible for determining the outlet nozzle configuration of this lifting thrust unit, with these segments being hingedly mounted at their forward ends for movement as indicated generally in FIGURE 7. Upper and lower actuators 84 and 85 are connected to the nozzle segments in offset relation to the hinge axes thereof so that by either contraction or expansion of these actuators, the upper and lower nozzle segments are caused to pivot so as to selectively change the exit outlet areas. The actuators 84 and 85 are pivotally mounted so as to be able to assume the appropriate angular relationship for deflecting the respective nozzle segments, and these actuators may be in the nature of hydraulic actuators, electrical screwjacks or the like, positioned by automatic means as will appear in more detail hereinafter.

Partitions, such as partitions 80 and 86 in FIGURE 6, may be employed to subdivide comparatively long span propulsion surfaces, for spanwise flow is not particularly desirable. In any event, however, spanwise flow is quite undesirable in the case of endmost portions of a propulsion surface, for any compressed gas flowing out of the ends (sides) of a hydrofoil thrust unit is lost to the propulsion arrangement. Accordingly, closing rib 86 is configured to permit the nozzle segments to pivot in the desired manner, while preventing spanwise flow from the end of the thrust unit.

Closing rib 86 is constituted by fixed walls 87 of a height corresponding approximately to the distance between the nozzle segments when in their innermost positions, as well as upper and lower surfaces, not shown. By virtue of an overlapping, telescoping plate arrangement, no endwise flow can take place even when the nozzle segments have been moved widely apart. This is because of the fact that a plate 88 is fixed to the underside of upper nozzle segment 82 and movable therewith, and a lower plate 89 is attached to and movable with lower nozzle segment 83, with these plates being arranged to move in and out of upper and lower slots (not shown) provided in the upper and lower surfaces of partition 86 for such purpose, and these plates form a telescoping barrier throughout all operative positions of the nozzle segments.

According to a preferred embodiment, the movable nozzle members are automatically positioned to suit the prevalent operation conditions and so as to provide realization of the complete expansion of the compressed gas which produces the maximum thrust attainable. A control system is therefore provided in which command signals and power are delivered to the actuators to bring about a selective movement of the upper and lower nozzle members, a typical arrangement involving an automatic nozzle position controller 91 as illustrated in FIGURE 7.

Automatic nozzle position controller 91 (the detailed design of which is not part of this invention), determines the optimum nozzle exit to suit the prevalent operational conditions and supplies power to the nozzle actuators as appropriate, for the generation of this exit area. The optimum nozzle exit area provides for complete expansion of the gas bubbles and complete transfer of the energy thus released directly to the water, before the mixture is exhausted from the nozzle, and at the same time is not overly large with respect to the cross-sectional area of the exhaust stream at the nozzle exit plane. An overly large exit area is to be avoided because it generates excessive drag by exposing the portion of the internal surface of the nozzle which is not occupied by the exhaust stream, to the ambient pressure at the nozzle exit plane which results in the generation of an aftward or drag force.

The optimum nozzle exit area is principally determined by the input pneumatic power, the water flow rate through the thrust generator, the energy level of the water as it enters the thrust generator, the static pressure rise of the water produced by the action of the inlet-diffuser, and the static pressure which prevails at the point of completion of the expansion process. The input pneumatic power in turn is determined by the flow rate, total pressure, static pressure and total temperature of the gas at the point of entry to the thrust generator, and the static pressure which prevails at the point of completion of the expansion process, which for practical purposes may be regarded as being equal to the static pressure of the free stream in the vicinity of the thrust generator.

The energy level of the water as it enters the thrust generator is determined by the static pressure and temperature of the water in the vicinity of the thrust generator and the dynamic and total pressures which are generated by the velocity of the thrust generator through the water.

The water flow rate through the thrust generator can, after appropriate calibration, be expressed in terms of the difference in static pressures at the inlet and exit of the inlet diffuser assembly. Similarly, the gas flow rate, after suitable calibration, can be expressed in terms of the total and static pressures and the total temperature in the pneumatic supply duct. Thus, all of the variables which combine to establish the optimum nozzle exit area can be measured in terms of pressures and temperatures and the numerical value of the exit area established from the following relationships:

$$V_{\text{exit(isentropic expansion)}} = \sqrt{V_2^2 + \frac{2gv_W}{\left(1+\frac{W_G}{W_W}\right)J}(P_{S_{W_2}} - P_{S_{W_{\text{Exit}}}}) + \frac{2g\frac{W_G}{W_W}}{\left(1+\frac{W_G}{W_W}\right)J}\left(\frac{\gamma}{\gamma-1}\right)P_{S_{G_2}}v_{G_2}\left[1 - \left(\frac{P_{S_{G_{\text{Exit}}}}}{P_{S_{G_2}}}\right)^{\frac{\gamma-1}{\gamma}}\right]}$$

$$V_{\text{exit(isothermal expansion)}} = \sqrt{V_2^2 + \frac{2gv_W}{\left(1+\frac{W_G}{W_W}\right)J}(P_{S_{W_4}} - P_{S_{W_2}}) + \frac{2g\frac{W_G}{W_W}}{\left(1+\frac{W_G}{W_W}\right)J}P_{S_{G_2}}v_{G_2}\ln\frac{P_{S_{G_2}}}{P_{S_{G_4}}}}$$

where:

$P_s$ = Static pressure
$v$ = Specific volume
$W$ = Weight flow rate
$J$ = Mechanical equivalent of heat
$g$ = Gravity constant
$\gamma$ = Ratio of specific heats ($\gamma = C_p/C_v$)
$V$ = Velocity and subscripts:
$W$ = Water
$G$ = Gas
0, 1, 2, 3, 4 = Station designations as shown in FIG. 7. Station 0 is the remote free stream.

$$A_{\text{exit}} = \frac{Q_W}{V_{\text{exit}_W}} + \frac{Q_G}{V_{\text{exit}_G}}$$

Where:
$A$ = Area
$Q$ = Volumetric flow rate

The gas bubbles will have essentially no velocity relative to the water ($V_{\text{exit}_G} = V_{\text{exit}_W}$). Therefore:

$$A_{\text{exit}} = \frac{Q_W + Q_G}{V_{\text{exit}}}$$

It should be noted that the preceding equations, which express the exit velocity of the gas-water mixture, describe exactly, or approximate the value attainable in practice, depending upon whether the expansion process achieved is isothermal, isentropic, or polytropic, which in turn, will be determined by the relative temperatures of the gas and water, the pressure ratio of the gas $$\frac{(P_{S_{G_2}})}{P_{S_{G_4}}}$$

and the amount of heat transferred between the gas and the water while the mixture travels through the exhaust nozzle.

The automatic nozzle position controller therefore is a computer (hydro-mechanical, pneumatic, electronic or electro-mechanical in type) which determines the optimum nozzle exit area as a function of $P_{T_{\text{gas}}}$, $P_{S_{\text{gas}}}$, $T_{T_{\text{gas}}}$, $P_{T_{0\text{water}}}$, $P_{S_{0\text{water}}}$, $P_{S_{\text{Diffuser inlet}}}$, $P_{S_{\text{Diffuser exit}}}$, and supplies appropriate power of command signals to the nozzle actuators through lines 98.

The total and static pressures of the input gas $P_{T_{\text{gas}}}$ and $P_{S_{\text{gas}}}$, are sensed by pitot static tube 92, the total temperature of the gas $T_{T_{\text{gas}}}$ is sensed by thermocouple or resistance bulb 93; the total and static pressures of the water in the free stream, $P_{T_{0\text{water}}}$ and $P_{S_{0\text{water}}}$, are sensed by pitot-static tube 94 and the diffuser static pressures $P_{S_{\text{Diffuser inlet}}}$ and $P_{S_{\text{Diffuser exit}}}$ are sensed by flush wall static pressure taps 95 and 96. These data are transmitted to the automatic nozzle position controller 91 via appropriate tubing and wiring.

Such a computer is well within the present state of the art and a hydro-mechanical computer of this type is typified in the R. J. Coar Patent No. 2,715,311.

The Coar mechanism, which is called a "Multiple Pressure Responsive Control Device for a Variable Area Nozzle of a Jet Engine," performs an identical function, i.e., it determines the optimum exit area for full expansion of a hot gas jet, through a variable area jet engine exhaust nozzle, as a function of appropriate pressures sensed at various strategic locations within the turbojet engine afterburner cycle. The optimum exhaust nozzle exit area and the corresponding nozzle exit area command signal are generated by the Coar device through the imposition of the input pressure data upon appropriately designed bellows and pistons, which operate in conjunction with suitable mechanical linkages, walking beam, springs, shuttle valves, etc. The computation function for exhaust nozzle exit area control in the system disclosed herein can be accomplished in the same general fashion as in the Coar device, or it can be accomplished with a computer which performs the same task by purely electronic or electro-mechanical means.

A hydro-pneumatic ramjet, according to this invention, may be incorporated directly into the design of the hull of a boat or ship in such a fashion as to eliminate the drag producing protuberances (skeg, propeller shaft hanger, etc.) employed with conventional propulsion systems. The drag of these items is significant, amounting to as much as 40% of the drag of the base hull. In FIGURE 8, a planing hull type of craft 99 is illustrated in which quantities of compressed gas are supplied to basic thrust unit 100 from a pair of gas turbines 111, causing these units to develop sufficient thrust for the propulsion of the craft at high speed. FIGURE 9 is a cutaway view that illustrates the details surrounding the combination of gas turbine and ramjet. It will be seen that compressed air delivered to scroll case 103 is supplied through a pipe 102 that connects with a plenum 107. A porous wall 106 separates the plenum from the passageway 101 of basic thrust unit 100 so that the mixture formed of compressed air from the plenum and water entering the inlet 104 is caused to flow rearwardly through outlet 105 to provide for the propulsion of the boat 99. The same type of detail as illustrated is repeated for each power plant used to propel the boat. It is preferable that the scroll case of each gas turbine fit into a common plenum so that in the event that failure of either engine, the entire ramjet unit may nevertheless be employed. Alternatively, however, each engine may be connected to an individual plenum.

It should be noted that no static thrust device is necessary to be employed in the embodiment illustrated in FIGS. 8 and 9, inasmuch as the tail pipe 108 of each engine is connected through the transom at the rear of the boat to exhaust the combustion gases produced by the engine rearwardly, thereby providing static propulsion for acceleration of the boat. This type of starting technique can also be employed in the hydro-foil embodiment as well as other embodiments of this invention.

As noted in FIG. 9, inlet 104 is of the flush type, and of a somewhat triangular shape necessitated by its placement at the center of the bottom of the boat, which has a modified keel. This flush inlet may be of a configuration of the type described in NACA (now NASA) Research Memorandum No. A8B16 and NACA (now NASA) Technical Note No. 2323. Also, the inlet could be of a bifurcated type or of a direct ram scoop type.

Directional control can be accomplished by the use of a movable exit nozzle (not shown). Reverse thrust can be provided by the use of an exit stream deverter device (not shown).

Referring now to FIGURE 11, an amphibious vehicle is there illustrated, which is of the type known as an amphibious DUKW, 120. As is to be seen, the vehicle is equipped with single forward wheels 121 capable of being steered, and tandum real wheels 122 on each side of the rear of the vehicle with the construction being of such a nature that a number of men or supplies may be carried. All wheels are fully retractable and in the retracted position are enclosed with flush fairing doors (not shown). The pneumatic drive system greatly facilitate retraction and extension of the wheels.

According to this embodiment, some or all of the wheels of the vehicle are supplied with a turbine drive arrangement 123 capable of propelling the vehicle over the ground once it has come ashore, this detail being illustrated in FIGURE 12.

Propulsion of the vehicle through the water is accomplished by a hydropneumatic ramjet arrangement along the general lines of the arrangement illustrated in FIGS. 8 and 9, namely, that a power plant 124 located forwardly in the vehicle supplied compressed gas under sufficient pressure to actuate either the ramjet for propulsion through the water or the individual wheel drives for overland travel. Preferably, the power plant 124 is a free piston or a gas turbine engine with the useful output of the engine being a quantity of compressed gas that is ducted through primary ducts 125 to the main duct 126 that interconnects with the ramjet unit in the general manner shown in FIGURE 7.

When the vehicle beaches and its wheels touch the ground, the driver may then operate control valve 127 that causes a redirecting of the compressed gas emanating from the engine into the plenum 128 illustrated in FIGURE 12, from which it may flow through stator blades 129 and impinge upon turbine buckets 130 that are dispersed in a spaced array about the turbine wheel 131. Turbine wheel 131 is disposed on a shaft 132 supported by bearings 133 and 134, with a gear 135 disposed at the opposite end of the shaft from turbine wheel 131, meshing with the larger of the two gears in intermediate gear assembly 136. The smaller of the gears of intermediate gear assembly 136 meshes with a large internal gear 137 in the manner shown in FIGURE 12. The large internal gear is secured to the wheel assembly 138 by bolts such that the motion of the turbine delivered through the gearing arrangement to internal gear 137 brings about movement of the wheel assembly 138. Movement in the reverse direction can be brought about by the use of an additional turbine wheel (not shown) having reversed blading and appropriate gas supply and exhaust arrangements, so that such turbine wheel, operating in the opposite direction, can cause reverse operation of the vehicle wheel.

It is, of course, necessary to prevent the undesirable entry of water into the turbine and gearing arrangement and this is accomplished by the use of a circumferential seal 139 that is located between the internal gear 137 and cover assembly 140. Also supported by cover assembly 140 is a brake 141 which allows the operator to stop the vehicle as required during its overland travel. An exhaust duct 142 is provided to carry the gases exhausted by the turbine overboard, with the exhaust duct being secured to the turbine housing 143 in a manner to prevent the undesirable entry of water.

Although we have described with particularity one means of utilizing the power from a gas generator for overland travel, it is to be understood that this may be accomplished by other means, such as with a conventional automotive type shaft power transmission system energized by shaft power derived from the compressed gas by means of a single centrally located turbine. Such a turbine may form an integral part of the compressed gas source, as is the case with the aircraft type gas turbine engines which are designed to produce both shaft power and pneumatic power, or it may be a completely separate turbine unit. Power for overland travel may also be provided by an entirely separate auxiliary engine.

In FIG. 13 an employment is illustrated that is based upon the so-called ground effect principle that utilizes an air cushion as a support for a vehicle 147 so that it can be propelled closely adjacent to the surface of the body of water. However, the vehicle of FIG. 13 varies from the usual air cushion vehicle in that incorporated into the configuration are a plurality of pylons 144 to which are affixed hydro-pneumatic ramjet units 145 in the nature of those shown and described in connection with FIGURES 3 through 7.

A large fan 146 is disposed at each end of the vessel 147 with each fan 146 being driven by its own power plant such as a turbojet engine, reciprocating engine, or the like. These fans are disposed in such a manner as to continuously inhale air, and to disperse the air substantially downwardly around the periphery of the vessel so as to create a cushion of air below the vessel to support same at a location several inches off the surface of a body of water.

IAS Paper No. 59–121, entitled "Ground Proximity: Critical Review" by G. B. Matthews and J. L. Wosser of the Office of Naval Research, deals with the basic theories and a number of the practical problems associated with ground proximity vehicles of the prior art. Many of the details far exceed the scope of the present invention and form no part thereof.

Suffice it to say, therefore, that a substantial continuous slot 148 is provided about the periphery of vessel 147, with the slot being angular so that air issuing therefrom is caused to flow downwardly and to create a cushion of air directly below the vessel to support same. At this point, appropriate valves (not shown) are then opened to allow high pressure gases to be delivered to the several hydro-pneumatic ramjet units 145 of the vessel 147 to provide for the propulsion of same over the surface of the water. After a certain speed has been reached, it is no longer necessary for the air issuing from slot 148 to be employed for the support of the vessel, inasmuch as the hydrofoils adequately support the vehicle. Upon this speed being reached, some of the high pressure air is blown into a circumferential tube 149, causing it to expand and close slot 148, thereby eliminating the ground effect and allowing the pressurized gas to be substantially entirely used for application to the hydrofoil units 145 for high speed forward propulsion.

FIGURE 14 presents actual test data taken in a hydrodynamic towing basin which illustrates conclusively the advantageous performance of the hydro-pneumatic ramjet. In FIGURE 14 a plot is shown of the isentropic propulsive efficiency of a model hydro-pneumatic ramjet of the general proportions illustrated in FIGURE 1, plotted as a function of free stream velocity. Also shown in FIGURE 14 is a plot of the peak efficiencies of a series of conventional propellers. It can be clearly seen from the data shown in FIGURE 14 that as the free stream velocity increases, the efficiency of the hydro-pneumatic ramjet ratio exceeds the efficiency of the conventional marine propellers. In FIGURE 14, isentropic propulsive efficiency is defined as the ratio of the horsepower which would be realized through an ideal isentropic expansion of the gas to the thrust horsepower generated by the model. With reference to the propeller data in FIGURE 14, the propulsive efficiency is defined as the ratio of the input brake horsepower to the thrust horsepower generated by the propeller, thus the two curves are directly comparable.

Although the data presented are limited by test facility capability to approximately 70 feet per second, the trend indicated by the curves clearly shows a continued improvement in the performance of the hydro-pneumatic ramjet over the propeller as speed increases. Although the model used was approximately 12 inches long and had a maximum external diameter of 3¼ inches, it is considered that these results would be representative of the results to be obtained from other suitably proportioned models of larger or different sizes and cross-sectional shapes.

Referring now to FIGURES 15 and 16, two different types of propulsion arrangement for torpedos are illustrated. FIGURE 15 represents a torpedo 151 in which the warhead 152 is of annular configuration with the water entering through a centrally disposed nose inlet duct 153. As in other applications, the compressed gas is liberated and intermixed with the entering water so as to provide a great amount of thrust, but in this instance the hot gases are supplied, for instance, from a liquid propellant arrangement 154. This liquid propellant which may be any of the mono- or bi-propellants commonly used in rocket motors may be dispersed in pressure vessels 154 spaced about the vehicle with only four being visible in FIGURE 15. The hot gases from the combustion chamber 155 flow through the porous inner wall of the combustion chamber 156 and through hollow struts 157 into a central pod 158.

A porous wall (not shown) is disposed in the after end of a central pod 158 so that the compressed gases emitting through this wall and those emitting simultaneously through porous combustion chamber wall 156 are intermixed with water so as to create a large number of bubbles that expand through the outlet of the torpedo in FIGURE 15.

Steerage and guidance of the torpedo may be affected by deflecting the exhaust stream in the proper direction with deflector vanes 159 which are positioned by actuators 160 upon command from the guidance system 161. It is to be noted that no static thrust system is pictured because the torpedo launching systems conventionally employed provide an initial velocity sufficient for satisfactory hydropneumatic operation.

Torpedo 162 shown in FIGURE 16, is a configuration to be employed when the warhead 163 used is not of such a nature as to be disposed in a toroidal manner. In this instance the warhead 163 is on one side of the torpedo 162 and the inlet-diffuser passageway 164 is on the other side of the missile in an unsymmetrical arrangement as shown in FIGURE 16. The tank 165 may contain cryogenic fuel such as liquid air, liquid nitrogen, or any of several other such liquified gases. An appropriate heating arrangement not shown is provided to convert the cryogen to the gaseous state by the addition of thermal energy obtained from the surrounding water within the passageway 166 connected to a plenum 167. This plenum 167 feeds gases through a porous wall 168 so that, in the manner previously described, the intermixing of the gas and water can be brought about in order to propel the torpedo through the water. The gases might also be generated by a solid state propellant or a liquid mono-propellant contained in tank 165.

As with torpedo 151, steerage and guidance of torpedo 162 may be affected by deflecting the exhaust stream in the appropriate direction with deflector vanes 169 which are positioned by actuators 170 upon command from the guidance system 171.

As to the design details of a ramjet-hydrofoil lifting thrust generator of the type illustrated in FIGS. 2 and 4, its external contour is that of an efficient airfoil, for example it may be a N.A.C.A. 16–025 laminar flow foil. The ramjet proportions are fitted into the boundary of the airfoil contour, so as to preserve the efficient lifting characteristics of the airfoil. The inlet lip configuration, is generated from the NACA Series 1 cowl contours (Ref. NACA RML52J23 and NACA L8A15). The exact contour is developed so as to match the contour of the airfoil and to provide the desired inlet area $A_1$. The procedure is as outlined in the quoted references.

The inlet area is selected so as to provide an inlet velocity ratio $(V_1/V_0)$ consistent with good induction system performance $(V_1/V_0=.5$ to $.9)$. The diffuser angle $\theta$ is limited by flow separation considerations to $\theta=8°$ max. The diffuser length is established by the degree of diffusion desired, which is defined by diffuser area ratio $A_2/A_1$. Since in the hydro ramjet, it is desired that the diffuser generate as high a static pressure in the mixing chamber as is practicable (and consistent with good inlet performance) the ratio of $A_2/A_1$ will ordinarily fall in the range of $A_2/A_1=2$ to 6 depending upon $V_0$, profile shape, etc.

The mixing chamber height is determined by the diffuser exit height, while the mixing chamber length is determined principally by the area required of the injection screen for an acceptably low pressure drop across the screen $(\Delta P \approx 1.0$ p.s.i.$)$. This is necessary because for a given input gas horsepower and gas flow rate, too low a screen area will result in high pressure drop and therefore, prohibitive loss in input gas horsepower. The screens may be parallel or divergent in a rearward direction, so as to provide a progressively duct increasing area to match the aftwardly increasing volume of gas present in the water. The screen area to inlet area will fall in the range of $$\frac{A \text{ screen}}{A_1} = 2.5 \text{ to } 25$$

The exit nozzle dimensions are determined by: (1) the vertical height of the exit of the mixing chamber, (2) the exhaust nozzle exit area, and (3) the shape of the airfoil selected. The exhaust nozzle exit area is that required for complete expansion (full realization of the work of expansion) and is computed according to the equations presented hereinbefore.

The spanwise length of the ramjet-hydrofoil combination is determined by:

(1) The area required for production of the desired amount of lift.

(2) The water flow rate which will enter the ramjet and which, in turn, will define the input horsepower which the ramjet will accept, and hence the thrust horsepower which will be generated. The ratio of water weight flow rate to air weight flow rate will fall in the range of $$\frac{Ww}{Wa} = 100 \text{ to } 2000$$

The structural details (load carrying members) and the details of the gas supply system upstream of the injection screens, are established according to conventional engineering practice.

The design details of a ramjet system which forms a flush and integral part of a planing hull, as for instance the types illustrated in FIGS. 8 and 11, are generated in essentially the same fashion, except that the inlet configuration is generated according to the procedures of NACA (now NASA) Research Memorandum No. A8B16 and NACA (now NASA) Technical Note No. 2323. The cross-sectional shape of the duct may be selected to suit the space available within the hull. The hydropneumatic ramjet exhaust stream may be discharged above or below the water line, as convenient.

As to the operation of devices according to this invention, the underwater ramjet propelled vessel is initially brought from rest up to minimum ramjet operational speed (approximately 20 to 30 miles per hour) by the action of the static thrust generator system. The input pneumatic power is directed to the static thrust generator nozzles by the use of appropriate valving in the pneumatic supply circuit. The compressed gas is accelerated to sonic velocity $(V \approx 1100$ ft./sec.$)$ in passing through the upper and lower injector nozzles and enters the water within the ramjet in a generally rearward and inward direction (as shown in FIG. 2).

The kinetic energy of the incoming gas is transferred to the water within the ramjet duct by the collision interchange process more commonly referred to as "scrubbing action." The water is caused to accelerate rearwardly along with the rearwardly injected gas and the resultant mixture is exhausted through the nozzle. The rearward acceleration of the water produces the desired thrust.

The orientation of the gas streams emanating from the injector nozzles also provides a "pneumatic curtain" effect which prevents (as proven by model test) any escape of gas in a forward direction (through the ramjet inlet) which would detract from the efficiency of the thrust generation process. The "pneumatic curtain" also permits generation of an elevated static pressure level within the ramjet duct system by closing down the exit area to suit ("start position"). This action has the effect of maximizing the exhaust velocity attainable and hence provides maximum thrust, and is produced by conversion of this additional static pressure increment to kinetic energy at the exit plane via expansion of the gas as it passes through the exit nozzle and the consequent additional acceleration of the water produced by application of the work of expansion to the water.

When minimum ramjet operational speed is attained, the pneumatic power is diverted from the static thrust generator system to the normal ramjet pneumatic circuit by operation of the valving. The nozzle exit area controller simultaneously assumes control of the position of the nozzle elements and provides the nozzle exit area necessary for complete expansion of the compressed gas as it passes through the ramjet nozzle and hence efficient thrust generation.

Once normal ramjet operational speed is achieved, the thrust level, and hence speed of the vessel, can be adjusted as desired by regulating the ramjet input power level via control of the pneumatic power source. Such control is effected in the fashion dictated by the characteristics of the pneumatic power source, i.e., operation of the throttle on the turbojet engine, etc. The exhaust nozzle controller will continuously provide the exit area which is the optimum for the prevalent operational conditions by generating a nozzle position command signal, as previously described.

As should be obvious, a thrust unit according to this invention can be utilized in vehicles and devices other than those illustrated, such as in the hull of a seaplane for assisting takeoff from the surface of water. The embodiment shown in FIGURE 9 would be typical of the thrust unit configuration involved for latter purpose, although several variations may of course be employed in aircraft hull use as well as planing hull and amphibious craft. As examples of these variations, exit nozzle control members may be utilized; compressed gas may be injected from both above and below the passageway; the source of compressed gas may be the main propulsion engines of the craft; and steerage members may be disposed in the exit of the passageway for turning the craft.

It should be noted that our underwater ramjet is a natural brake when the compressed gas supply is cut off, because the water flow rate through the passageway then increases considerably to the point that separation occurs within the diffuser, which generates a large drag or retarding force.

We claim:
1. A hydro-pneumatic ramjet propulsion system for effectively propelling a marine vehicle through the water utilizing a remotely situated gas generator having a high specific power capability, comprising a thrust unit integral with the hydrodynamic configuration of said vehicle, an unobstructed passageway through said thrust unit through which water may flow, said passageway having an inlet for water and an outlet at the aft end of said passageway for conducting water through said passageway, a diffuser section adjacent said inlet for decreasing the velocity of the water entering the passageway so as to thereby increase its static pressure, means downstream of said diffuser section for injecting into said passageway substantial quantities of gas from a remotely situated gas generator, the pressure of the gas being only slightly greater than the pressure of the water in said passageway, said means for injecting including a porous wall member in said passageway for causing the pressurized gas to be in the form of a large number of small bubbles widely dispersed into the ingested water, and an expansion nozzle adjacent said outlet for expanding the gas-water mixture rearwardly through said outlet thereby to cause the transfer of the energy of the pressurized gas directly to the ingested water so as to provide substantial thrust for said vehicle.

2. The propulsion system as defined in claim 1 in which said vehicle is an amphibious truck having wheels for overland travel when the truck has come ashore, means for driving said wheels, and means for switching the power of said gas generator from said thrust unit to said wheel driving means for overland travel.

3. The propulsion system as defined in claim 1 in which said thrust unit is integrated into a hydrofoil mounted upon a pylon and disposed substantially below the hull of said vehicle, thereby to furnish thrust as well as lift.

4. The propulsion system as defined in claim 1 in which said vehicle is a high-speed torpedo utilizing jet stream deflectors for directional control.

5. A propulsion system as defined in claim 1 in which additional injection means are disposed in said thrust unit adjacent said inlet for injecting, during the starting phase of the operation of said thrust unit, compressed gas from said gas generator into the water flowing through said passageway, said additional injection means being directed generally rearwardly to induce the flow of water through said passageway even at zero thrust unit speed, and at the same time prevent the escape of gas in the forward direction, and valve means for redirecting the gas away from said additional injection means when the vehicle is underway.

6. A propulsion system as defined in claim 1 in which said gas generator produces substantial quantities of exhaust products, and said system includes means for directing said exhaust products rearwardly to provide starting thrust for said vehicle until such time as said thrust unit has developed thrust.

7. A hydro-pneumatic ramjet system as defined in claim 1 in which the said expansion nozzle adjacent to said outlet is of a convergent-divergent configuration for expanding the gas-water mixture most efficiently at very high speeds.

8. The hydro-pneumatic ramjet propulsion system of claim 1 wherein said gas is substantially non-condensible in said water passing through said thrust unit.

9. The hydro-pneumatic ramjet propulsion system of claim 1 wherein said gas is exhaust gas from a gas turbine engine.

10. The hydro-pneumatic ramjet propulsion system of claim 1 wherein said gas is compressed air.

11. A lifting thrust generator for propelling a vessel with its hull carried clear of the water comprising a hydrofoil, means for supporting said hydrofoil in proper operative relation with respect to the hull of the vessel, a hydro-pneumatic thrust unit integrated into said hydrofoil including a passageway, said passageway having an inlet disposed at the upstream end of said hydrofoil and an outlet disposed at the downstream end thereof for conducting water through said passageway when said vessel is underway, said thrust unit containing diffuser means in said passageway connected to said inlet for decreasing the velocity of water entering said inlet thereby to increase the static pressure thereof, non-obstructing injection means located in a central portion of said thrust unit and connected to said diffuser means for evenly dispersing compressed gas into the water flowing through said passageway in the form of a large number of tiny bubbles, the injection pressure of the compressed gas being only slightly greater than the static pressure of the water in said unit, and an expansion nozzle for extracting a considerable amount of useful thrust from the gas-water mixture created in said thrust unit by said injection means, said nozzle being disposed between the downstream end of said injection means and said outlet, whereby the thrust generated by said unit propels the vessel through the water and simultaneously the external foil shape of the thrust generator produces lift.

12. The lifting thrust generator as defined in claim 11 in which said expansion nozzle is defined by movable members, said movable members being arranged to alter the cross-sectional area of said nozzle exit to compensate for variations in operational conditions, thereby to extract an optimum amount of thrust, and automatic means for controlling the position of said members for the thrust unit in accordance with the prevailing fluid dynamic variables, including variations in the flow rate of the water through the thrust unit, flow rate and input energy level of the compressed gas, free stream velocity and ambient pressure.

13. The lifting thrust generator as defined in claim 11 in which said hull is configured to utilize the ground effect principle, said hull having at least one means therein for creating a large quantity of compressed gas, a slot extending around a substantial portion of the circumference of said hull through which said gas may issue, thereby to sustain said hull a short distance above the surface of the water, and means for diminishing the quantity of compressed gas delivered to said slot upon said vessel reaching sufficient speed as to be entirely sustained by said hydrofoil.

14. A hydro-pneumatic ramjet propulsion arrangement for propelling a marine vehicle through the water at high speed by an expansion process comprising a basic thrust unit having an unobstructed passageway therethrough through which water may flow when the vehicle is underway, said basic thrust unit being integrated into the hydrodynamic configuration of the vehicle so as to produce a minimum of distortion of the configuration and to eliminate all drag-producing appendages, said passageway comprising an inlet and diffuser, said diffuser being arranged to slow the water entering said passageway so as to raise the static pressure thereof, a non-protruding injection means peripherally disposed in said passageway at a location in which the static pressure is highest for injecting quantities of compressed gas from a gas generator into the water ingested by said thrust unit, said injection means including means for breaking up the compressed gas into a very large number of tiny gas bubbles to be dispersed comparatively evenly through the ingested water, thereby to obtain a homogeneous gas-water mixture rearwardly so as to supply a considerable amount of thrust with a minimum of drag, the gas-water mixture leaving said exhaust nozzle being at a speed sufficiently high for propulsion of the vehicle through the water without excessive jet wake losses, thereby becoming an effective arrangement for the direct transfer of energy.

15. The propulsion arrangement as defined in claim 14, including starting means for initially propelling said vehicle, said starting means including means for injecting quantities of gas from said gas generator along said passageway in a generally rearward direction, thereby imparting energy to the ingested water by a collision process and simultaneously providing a pneumatic curtain which prevents the escape of gas in a forward direction.

16. The propulsion arrangement as defined is claim 14 in which said exhaust nozzle utilizes at least one movable member for controlling the exit nozzle area, and means for actuating said movable member in response to variations in input gas horsepower, water flow rate, free stream velocity, and changes in ambient static pressure of the water.

17. A high speed, low drag propulsion system for a hydrofoil type craft utilizing no propeller for its propulsion, comprising a plurality of pylons extending downwardly below the hull of the craft, a hydrofoil connected to each said pylon in the vicinity of the lowermost end thereof, a thrust unit positioned within at least one of said hydrofoils with at least one passageway through each unit through which water is caused to flow as the craft moves through the water, injection means located in a mid portion of each thrust unit for injecting quantities of high pressure gas into the water ingested by said units, to mix thoroughly with the ingested water, and an expansion nozzle at the aft end of said passageways through which the gas-water mixture can expand, thereby to supply thrust for the propulsion of the craft through the water.

18. The propulsion system as defined in claim 17 in which supplementary injection means are employed in a forward portion of the passageway of each unit, through which compressed gas can be injected in quantity in a rearward direction, thereby to induce flow of water through said passageway for starting purposes, even at zero speed of the craft, said pylons containing separate passageways for carrying the compressed gas to be used by said injection means, and said supplementary injection means.

19. The propulsion system as defined in claim 17 in which gas turbine engines including tailpipes are employed aboard said craft for delivering compressed gas, and said tailpipes of said engines are directed rearwardly for providing starting thrust for said craft.

20. The hydrofoil craft as defined in claim 17 in which air cushion means are provided for supporting said craft at a location slightly off the surface of the water by ground effect principles, said means including a slot disposed substantially about periphery of said craft through which high pressure gas may flow downwardly, means in said vessel for supplying large quantities of high pressure gas, means for directing one portion of said gas through said slot for causing said craft to hover just above the surface of the water, and means for directing another portion of said gas through said thrust units to provide motion of the craft through the water at substantial speeds.

References Cited in the file of this patent

UNITED STATES PATENTS

| | | |
|---|---|---|
| 2,278,255 | Grabbe | Mar. 31, 1942 |
| 2,355,604 | Rupp | Aug. 15, 1944 |
| 2,371,687 | Gerhardt | Mar. 20, 1945 |
| 2,397,791 | Kramer et al. | Apr. 2, 1946 |
| 2,406,290 | Hait | Aug. 20, 1946 |
| 2,408,928 | Hait | Oct. 8, 1946 |
| 2,412,825 | McCollum | Dec. 17, 1946 |
| 2,431,132 | Malina | Nov. 18, 1947 |
| 2,461,797 | Zwicky | Feb. 15, 1949 |
| 2,463,820 | Stafford | Mar. 8, 1949 |
| 2,569,997 | Kollsman | Oct. 2, 1951 |
| 2,688,945 | Hughes | Sept. 14, 1954 |
| 2,696,077 | Goodman | Dec. 7, 1954 |
| 2,699,644 | Coanda | Jan. 18, 1955 |
| 2,714,800 | Gongwer | Aug. 9, 1955 |
| 2,749,870 | Vavra | June 12, 1956 |
| 2,795,201 | Fogarty et al. | June 11, 1957 |
| 2,903,850 | Lang | Sept. 15, 1959 |
| 2,906,228 | Wendel | Sept. 29, 1959 |
| 2,910,953 | Karig | Nov. 3, 1959 |
| 2,920,448 | Coanda | Jan. 12, 1960 |
| 3,048,140 | Davis | Aug. 7, 1962 |

FOREIGN PATENTS

| | | |
|---|---|---|
| 219,133 | Australia | Nov. 24, 1958 |
| 829,174 | France | Mar. 14, 1938 |
| 287,510 | Great Britain | Oct. 22, 1928 |
| 715,880 | Great Britain | Sept. 22, 1954 |